(12) United States Patent
Coleman et al.

(10) Patent No.: US 10,893,175 B2
(45) Date of Patent: Jan. 12, 2021

(54) SHADOWLESS CAMERA HOUSING

(71) Applicant: Bendix Commercial Vehicle Systems LLC, Elyria, OH (US)

(72) Inventors: Jeffrey Coleman, Santa Ana, CA (US); Lenny Tan, Diamond Bar, CA (US); Robert Charnock, Anaheim, CA (US); Zheng Li, Irvine, CA (US); Reza Khamsi, Mission Viejo, CA (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 0 days.

(21) Appl. No.: 16/287,905

(22) Filed: Feb. 27, 2019

(65) Prior Publication Data

US 2020/0274995 A1 Aug. 27, 2020

(51) Int. Cl.
*H04N 5/225* (2006.01)
*F21V 8/00* (2006.01)
*B60R 1/00* (2006.01)

(52) U.S. Cl.
CPC ............. *H04N 5/2252* (2013.01); *B60R 1/00* (2013.01); *G02B 6/0096* (2013.01);
(Continued)

(58) Field of Classification Search
CPC ................ H04N 5/2252; G02B 6/0096; B60R 2300/103; B60R 2300/8006
See application file for complete search history.

(56) References Cited

U.S. PATENT DOCUMENTS 6,601,768 B2 8/2003 McCall et al.
7,127,163 B2 10/2006 Lee et al.
(Continued)

FOREIGN PATENT DOCUMENTS

CA 2 916 607 A1 8/2016
CN 202057939 U 11/2011
(Continued)

OTHER PUBLICATIONS

"1296.7024 Mentor PCB Mounted 8-Way LED Light Pipe, Quad-Level Clear Dome Lens", https://au.rs-online.com/web/p/led-light-pipes/8796399/, RS Components, 3 total pages.
(Continued)

*Primary Examiner* — Christopher K Peterson
(74) *Attorney, Agent, or Firm* — Crowell & Moring LLP

(57) ABSTRACT

A camera assembly includes a circuit board on which an imager is mounted, and a lens assembly mounted over the imager to the circuit board. The camera assembly further includes a first infrared light source mounted on the circuit board at a first location, and a second infrared light source mounted on the circuit board at a second location. A first light pipe is mounted to the circuit board at the first location, while a second light pipe is mounted to the circuit board at the second location. The circuit board, lens assembly, first and second infrared light sources, and first and second light pipes are disposed in a housing, which includes a front housing and a rear housing. The first and second light pipes extend from the circuit board to the front housing such that light is conveyed from the first and second infrared light sources, respectively, to an illumination exit plane of the camera assembly.

14 Claims, 3 Drawing Sheets

(52) U.S. Cl.
CPC ......... *H04N 5/2253* (2013.01); *H04N 5/2254* (2013.01); *B60R 2300/103* (2013.01); *B60R 2300/8006* (2013.01)

(56) References Cited

U.S. PATENT DOCUMENTS

| | | | |
|---|---|---|---|
| 7,822,335 B1 | 10/2010 | Pastore | |
| 8,894,259 B2 | 11/2014 | Haugan et al. | |
| 9,329,332 B2 | 5/2016 | Gerst, III et al. | |
| 9,585,549 B1* | 3/2017 | Elazar | A61B 1/00041 |
| 9,891,109 B2 | 2/2018 | Sheridan | |
| 10,003,727 B1 | 6/2018 | Hsu et al. | |
| 10,107,677 B2 | 10/2018 | Coombes et al. | |
| 2006/0039692 A1 | 2/2006 | Lee et al. | |
| 2007/0152064 A1 | 7/2007 | Nunnink et al. | |
| 2007/0242924 A1* | 10/2007 | Cianciotto | G02B 6/0008 385/133 |
| 2011/0069507 A1 | 3/2011 | Haugan et al. | |
| 2016/0044215 A1* | 2/2016 | Tsujikawa | G06K 9/209 348/373 |
| 2016/0238450 A1 | 8/2016 | Sheridan | |
| 2017/0291548 A1* | 10/2017 | Kim | G03B 15/05 |
| 2017/0302834 A1* | 10/2017 | Lee | G02B 19/0066 |
| 2018/0074519 A1* | 3/2018 | Qin | B64C 39/024 |
| 2018/0160018 A1 | 6/2018 | Hsu et al. | |
| 2019/0311180 A1* | 10/2019 | Tang | H04N 5/2257 |

FOREIGN PATENT DOCUMENTS

| | | |
|---|---|---|
| CN | 103335279 A | 10/2013 |
| CN | 106657992 A | 5/2017 |
| EP | 1 244 927 B1 | 9/2005 |
| WO | WO 2013/070091 A2 | 5/2013 |

OTHER PUBLICATIONS

Bosse et al., "Open LED Illuminator: A Simple and Inexpensive LED Illuminator for Fast Multicolor Particle Tracking in Neurons", PLOS ONE, Nov. 23, 2015, https://doi.org/10,1371/journal.pone.0143547, 13 total pages.

"Fixed-Mount and Handheld Barcode Readers", Cognex, Robovision, www.robovision.gr, 16 total pages.

"1275.1001 Mentor PCB Mounted LED Light Pipe, Clear Round Lens", https://uk.rs-online.com/p/led-light-pipes/8796235/, RS Components, 4 total pages.

* cited by examiner

SHADOWLESS CAMERA HOUSING

FIELD OF THE INVENTION

The invention relates to a camera housing design, and in particular to an in-vehicle camera housing design which provides for shadowless propagation of infrared light into a vehicle's passenger compartment.

BACKGROUND

Cameras designed to capture imagery from a vehicle's passenger compartment are preferably able to capture clear imagery (video and/or still image data) even when the passenger compartment is not well lit, such as when the vehicle is being driven at night. In these cases, in-vehicle camera assemblies are known to incorporate additional illumination sources to provide a light source in the infrared (IR) spectrum, which is largely not visible to the human eye. Moreover, the sources for such IR light have been integrated into the camera's housing in order to provide a compact and integrated design, as well as to provide optimal directional lighting towards both the driver and passenger areas. However, as detailed further below, existing camera housing designs tend to produce a shadowing effect which does not allow for an optimal distribution of IR light throughout the vehicle's passenger compartment, and in fact tends to focus more light in areas of less interest.

By way of example, one such known camera housing design is depicted in FIG. 1. In this known design, the camera assembly 100 comprises an outer housing portion 110 extending from a housing base 120 to an illumination exit plane for two IR light sources, which are depicted as IR-emitting diodes 140a, 140b (IR LEDs) mounted on a circuit board 130. The illumination exit plane refers to the point/plane along which illumination is emitted from the camera assembly 100 into the vehicle's passenger compartment.

In addition, the camera assembly 100 also comprises an imager semiconductor chip (not shown) which is also mounted on the circuit board 130. Since the imager requires a lens assembly to focus the image data onto the imager, a differently configured inner housing portion 150 is required to accommodate such a lens assembly 160 which is mounted over the imager and onto the circuit board 130. As shown in FIG. 1, the inner housing portion 150 extends from the outer housing portion 110 in a direction extending away from the housing base 120 such that the height dimension, as measured from the housing base 120, is greater for the inner housing portion 150 than for the outer housing portion 110. In this fashion, the inner housing portion 150 houses the lens assembly 160 that is mounted over the imager chip (not shown), while the outer housing portion 110 houses the IR LEDs 140a, 140b. Each light source is intended to provide lighting towards the driver area or passenger area, respectively.

While one result of this configuration is to provide a camera housing which minimizes the volume it occupies within the passenger compartment, a significant drawback of this design is that the illumination cones generated by IR LEDs 140a, 140b are partially obscured by the inner housing portion 150, which in turn results in a shadowing effect such that a uniform light distribution throughout the passenger compartment is not achievable. Moreover, the unshadowed area extending outward from each IR LED 140a, 140b is only illuminated by one source (i.e., either IR LED 140a or 140b), whereas the unshadowed, central, area inward from each light source is illuminated by both LEDs. In the context of vehicle interiors, this tends to result in the driver and passenger each being illuminated by one light source, whereas the center of the passenger compartment, which is generally of less interest, is illuminated at least to some extent by both LEDs. Having lower levels of light in the areas of particular interest (i.e., the driver and passenger areas) is undesirable and leads to a less optimal image capturing environment As such, there is a need in the art for a camera housing design which does not suffer from these drawbacks.

SUMMARY OF THE INVENTION

In one embodiment of the invention, a camera assembly comprises a circuit board on which an imager is mounted, and a lens assembly mounted over the imager to the circuit board. The camera assembly further includes a first infrared light source mounted on the circuit board at a first location, and a second infrared light source mounted on the circuit board at a second location. A first light pipe is mounted to the circuit board at the first location, while a second light pipe is mounted to the circuit board at the second location. The circuit board, lens assembly, first and second infrared light sources, and first and second light pipes are disposed in a housing, which includes a front side and a rear side. The first and second light pipes extend from the circuit board to the front side of the housing such that light is conveyed from the first and second infrared light sources, respectively, to an illumination exit plane of the camera assembly.

A method for manufacturing a camera assembly, in accordance with the principles of the invention includes mounting an imager on a circuit board, mounting a lens assembly over the imager to the circuit board, mounting a first infrared light source to the circuit board at a first location and mounting a second infrared light source to the circuit board at a second location. The method further includes mounting a first light pipe to the circuit board at the first location, mounting a second light pipe mounted to the circuit board at the second location, and encasing the circuit board, lens assembly, first and second infrared light sources, and first and second light pipes in a housing, wherein the housing comprises a front side and a rear side. The first and second light pipes extend from the circuit board to the front side of the housing such that light is conveyed from the first and second infrared light sources, respectively, to an illumination exit plane of the camera assembly.

Other objects, advantages and novel features of the present invention will become apparent from the following detailed description of one or more preferred embodiments when considered in conjunction with the accompanying drawings.

DESCRIPTION OF EXEMPLARY EMBODIMENTS OF THE INVENTION

In the following description of the present invention reference is made to the accompanying figures which form a part thereof, and in which is shown, by way of illustration, exemplary embodiments illustrating the principles of the present invention and how it is practiced. Other embodiments can be utilized to practice the present invention and structural and functional changes can be made thereto without departing from the scope of the present invention As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment", "certain embodiments", "an embodiment" or similar term means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner on one or more embodiments without limitation.

Figure 2:
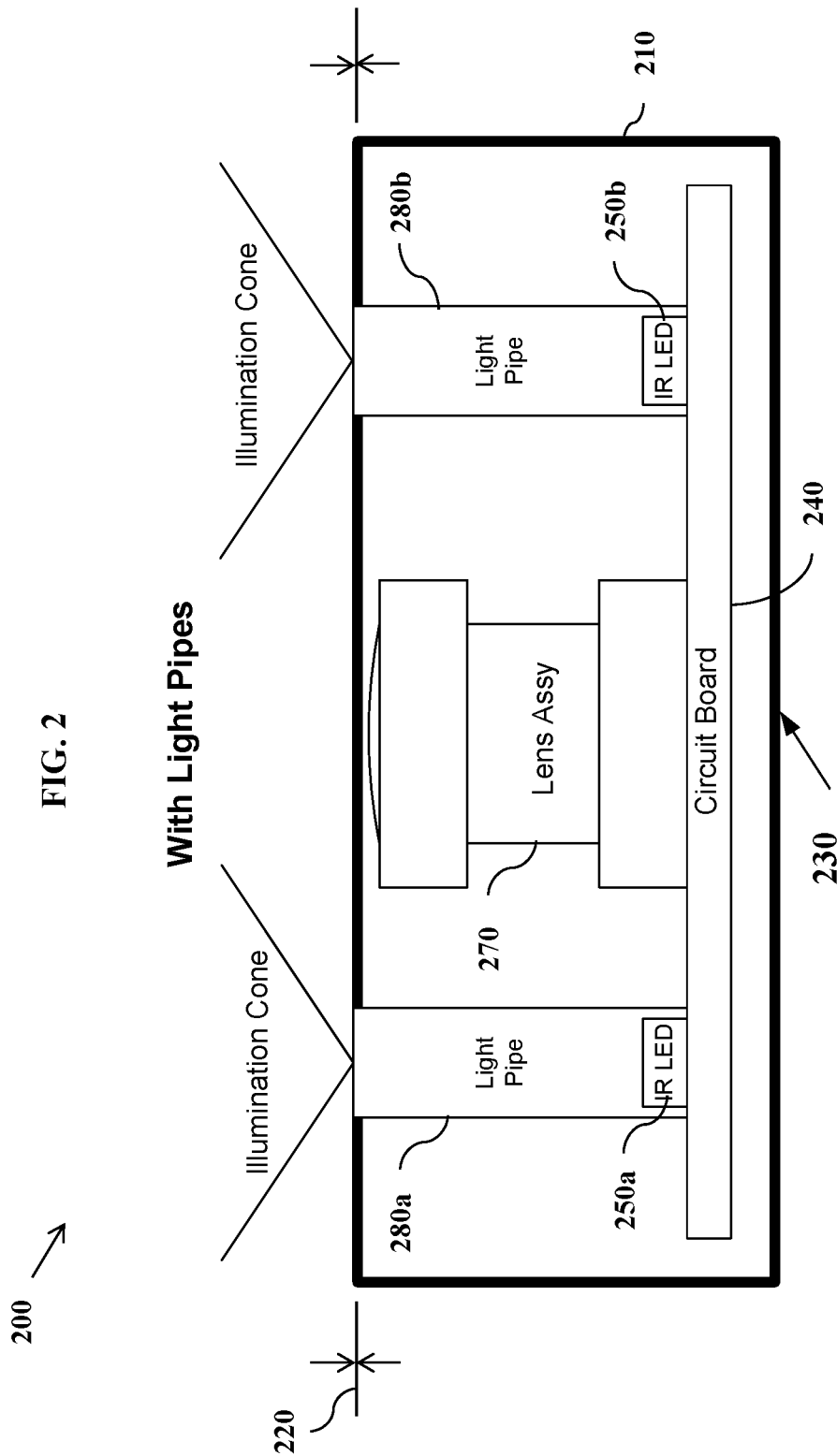
FIG. 2 is a diagram of one embodiment of a camera assembly mountable in a vehicle's passenger compartment, configured in accordance with the principles of the invention.

Referring now to FIG. 2, depicted is one embodiment of a camera assembly 200 configured in accordance with the principles of the invention. In this embodiment, a lens assembly 270 is mounted over an imager (not shown) and to the circuit board 240. Two IR LEDs 250a, 250b project IR light into the driver and passenger areas, respectively, which are also mounted to the circuit board 240. In other embodiments, alternate light sources may be used, such as ultraviolet or even low-level visible light.

It should be appreciated that the imager of FIG. 2 (not shown) may be a semiconductor chip that typically has a two-dimensional rectangular sensor array that includes a large number of photo sensors that are each capable of converting light incident upon it into an electrical signal that is proportional to the intensity, and in the case of a color camera or the like, the color and hue of the incident light. The individual photo sensors may be, among others, charge-coupled-devices ("CCDs") or complementary metal oxide semiconductor (CMOS) devices formed by techniques known in the art. Signal processing circuitry (also not shown) is typically provided external to the sensor for converting the signals generated thereby into a digital signal capable of being stored, processed or distributed. Further details of one or more embodiments of the circuit board 240, imager and lens assembly 270 are set forth in U.S. Pat. No. 8,553,131, the entire disclosure of which is hereby incorporated by reference.

Figure 1:
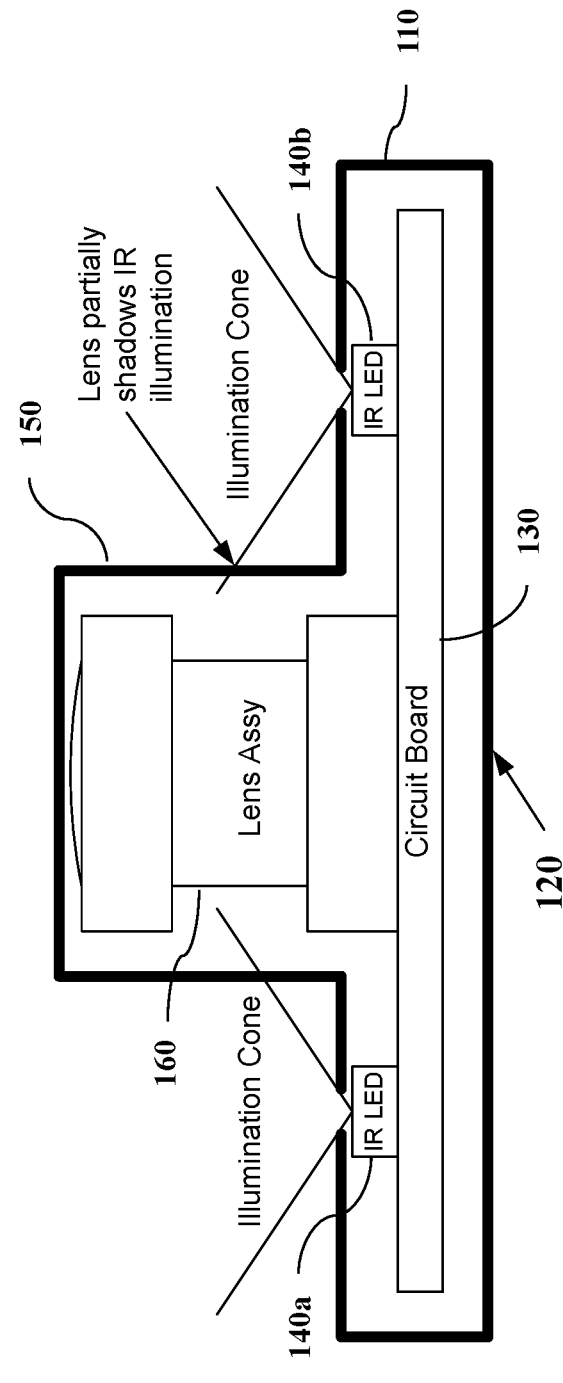
FIG. 1 is a diagram of a prior art camera assembly mountable in a vehicle's passenger compartment.

Continuing to refer to FIG. 2, the camera assembly 200 comprises a camera housing 210 having a uniform cross-section such that its illumination exit plane 220 (i.e., defining the point/plane at which illumination is emitted from the camera assembly 200 into the vehicle's passenger compartment) is at essentially the same or similar distance from the camera base 230 as is the end of the lens assembly 270. As a result, the illumination cone generated by each IR LED 250a, 250b is now unhindered, and a more desirable, more even lighting pattern through the passenger compartment is achieved without the aforementioned shadowing effect. Moreover, light from both IR LEDs 250a, 250b is able to illuminate the driver's area and the passenger's area, which is not the case with the prior art approach described above with reference to FIG. 1.

The IR LEDs 250a, 250b are mounted to the circuit board 240, as shown in FIG. 2, and are therefore located a distance away from the illumination exit plane 220. As such, one aspect of the invention is to use light pipes 280a, 280b to convey light from the IR LEDs 250a, 250b to the illumination exit plane 220. In certain embodiments, the light pipes 280a, 280b have total internal reflection, based on the shape, incident angle and index of refraction for the chosen material, and can double as wavelength filters. In particular, while IR light is mostly not visible to the human eye, IR LEDs tend to still emit a dull red glow, which can be distracting and otherwise undesirable to vehicle occupants. However, the light pipes 280a, 280b may be configured to block such glow and thereby further enhance the user experience by minimizing the driver's awareness of the camera's presence.

Figure 3:
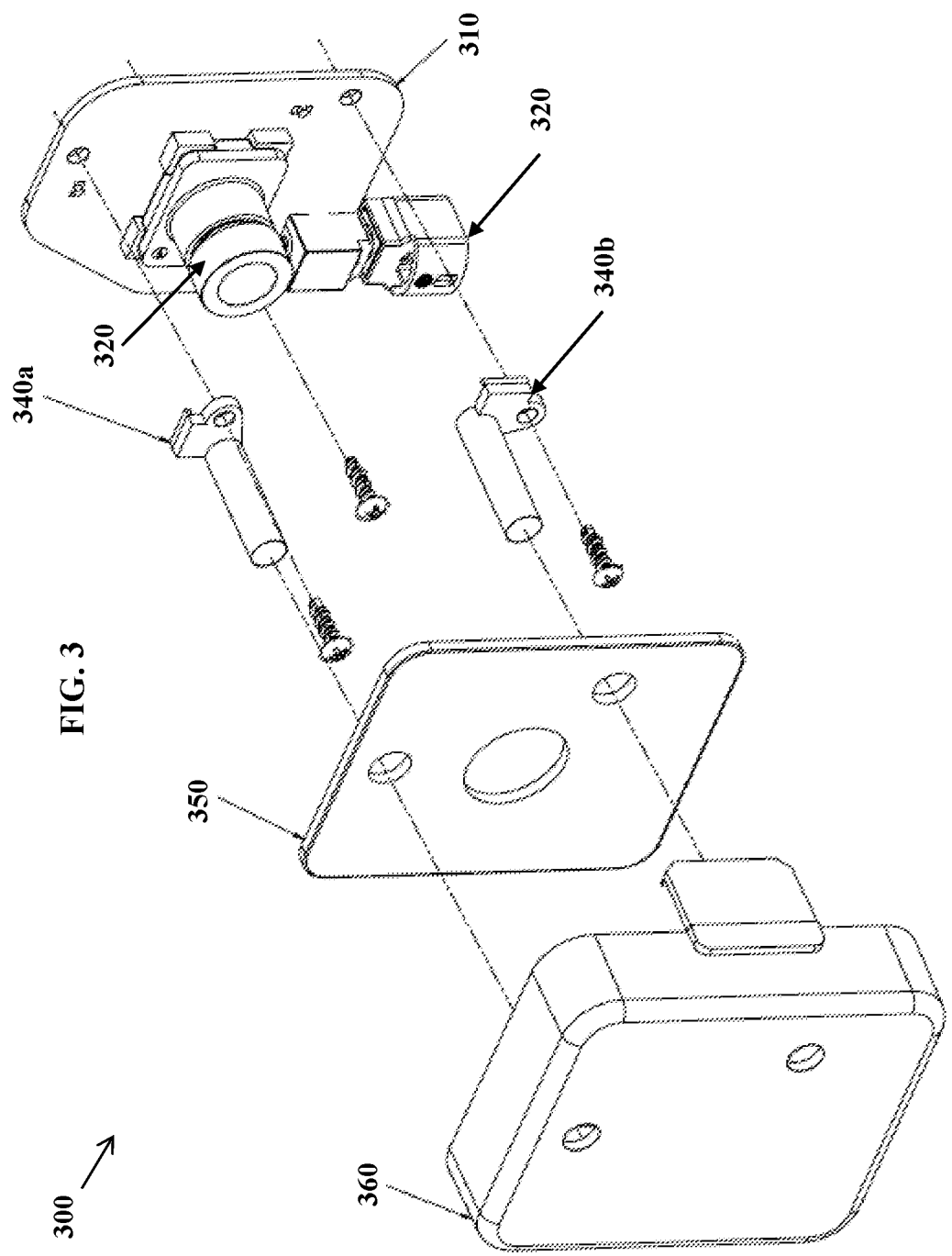
FIG. 3 is an expanded view of one embodiment of the camera assembly of FIG. 2 with rear housing not shown.

Referring now to FIG. 3, depicted is an expanded view of a camera assembly 300 configured in accordance with the principles of the invention.

As shown, circuit board 310 comprises an imager (not shown) over which a lens assembly 320 is mounted. A connector 320 is provided to electrically and/or physically couple the camera assembly 300 to external components as needed to secure the camera assembly in a vehicle's passenger compartment and/or to facilitate the transmission of captured image data to an external storage and/or processor.

Continuing to refer to FIG. 3, light pipes 340a, 340b are mounted to the circuit board 310 over corresponding IR LEDs (not shown), while a shield 350 may optionally be used to hide components on the circuit board 310 from view.

With this arrangement, additional optical blocks or baffling inside the housing are not required to avoid any internal light leakage because of the light pipes' total internal reflection.

Finally, the housing front 360 may be secured to a housing rear (not shown) to fully encase the aforementioned components, where the housing front 360 is essentially flat across the lens assembly 320 and IR LEDs 340a, 340b, thereby providing an essentially uniform cross-section such that the illumination exit plane (i.e., defining the point/plane at which illumination is emitted from the camera assembly 300 into the vehicle's passenger compartment) is in essentially the same or similar plane as the end of the lens assembly 320.

It should further be appreciated that the housing for the camera and illumination assemblies may be reflective and/or otherwise shape the illumination. For example, if it is desired to more brightly illuminate the driver area, a reflective plane, normal to the direction of the driver's location, may be incorporated into or adjacent to the housing front 360. As this reflectivity need only be in the invisible IR range, the housing would not take on a 'shiny' characteristic.

Still another aspect of the invention is to configure the light pipes with a radiused, textured, exit. Such a radius and texture serve to shape and diffuse the illumination cone in order to achieve a more uniform distribution of light throughout the vehicle's passenger compartment. For example, while a flat polished end of the light pipe will tend to provide a more concentrated light beam, a rounded end can advantageously be used to provide a wider, more diffuse spread of light. In addition, it has also been found that increasing the roughness of the light pipe end will correspondingly increase light diffusement. Moreover, widening the end of the light pipe correspondingly widens the area of illumination. In one embodiment, a diameter of between 5 mm and 6 mm provides a preferred area of illumination within the vehicle's passenger compartment. A more complicated, multi-radius design may also be used if additional beam shaping is needed. Such beam shaping and dispersion is not possible in existing systems without the use of additional optics over the LEDs.

In view of the above, one benefit of the invention is to use light pipes to convey light originating from a circuit-board-mounted IR LED to the surface of the camera assembly, while also isolating the light from the rest of the housing.

Another benefit of the invention is the ability to change the shape and size of the light cones by altering the radius and texture characteristics of the end of the light pipes.

Moreover, it should be appreciate that the light pipes can be manufactured using various materials that are the same or differ from the cover. This allows the color and characteristics of the light pipes and the cover to be separately designed, according to the desired characteristics.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A camera assembly comprising:
    a circuit board on which an imager is mounted;
    a lens assembly mounted over the imager to the circuit board;
    a first infrared light source mounted on the circuit board at a first location that corresponds to a driver area of a passenger compartment;
    a second infrared light source mounted on the circuit board at a second location that corresponds to a passenger area of the passenger compartment;
    a first light pipe mounted to the circuit board at the first location;
    a second light pipe mounted to the circuit board at the second location; and
    a housing comprising a front side and a rear side, wherein the circuit board, lens assembly, first and second infrared light sources, and first and second light pipes are disposed in the housing,
    wherein the first and second light pipes extend from the circuit board to the front side of the housing such that light is conveyed from the first and second infrared light sources, respectively, to an illumination exit plane of the camera assembly at the front side of the housing, which housing thereby does not obstruct respective illumination cones produced at the illumination exit plane,
    wherein an end of the first and second light pipes, respectively, each have a textured exit geometry providing a diffused, light cone, and
    wherein a diameter of the end of the first and second light pipes, respectively, is between 5 and 6 mm.

2. The camera assembly of claim 1, wherein the camera assembly is configured to be mounted in a passenger compartment of a vehicle.

3. The camera assembly of claim 1, wherein the housing comprises a uniform cross-section such that the illumination exit plane is at essentially the same distance from the circuit board as is a distal end of the lens assembly.

4. The camera assembly of claim 1, wherein the first and second light pipes have total internal reflection.

5. The camera assembly of claim 1, wherein the first and second light pipes have optical transmissivity characteristics limiting light wavelengths that are conveyed from the first and second infrared light sources, respectively, to the illumination exit plane of the camera assembly.

6. A method for manufacturing a camera assembly, the method comprising:
    mounting an imager on a circuit board;
    mounting a lens assembly over the imager to the circuit board;
    mounting a first infrared light source to the circuit board at a first location that corresponds to a driver area of a passenger compartment;
    mounting a second infrared light source to the circuit board at a second location that corresponds to a passenger area of the passenger compartment;
    mounting a first light pipe to the circuit board at the first location;
    mounting a second light pipe mounted to the circuit board at the second location; and
    encasing the circuit board, lens assembly, first and second infrared light sources, and first and second light pipes in a housing, wherein the housing comprises a front side and a rear side,
    wherein the first and second light pipes extend from the circuit board to the front side of the housing such that light is conveyed from the first and second infrared light sources, respectively, to an illumination exit plane of the camera assembly at the front side of the housing, which housing thereby does not obstruct respective illumination cones produced at the illumination exit plane,
    wherein an end of the first and second light pipes, respectively, each have a textured exit geometry providing a diffused, light cone, and
    wherein a diameter of the end of the first and second light pipes, respectively, is between 5 and 6 mm.

7. The method of claim 6, further comprising mounting the camera assembly in a passenger compartment of a vehicle.

8. The method of claim 6, wherein the first location corresponds to a driver area of a passenger compartment, and wherein the second location corresponds to a passenger area of the passenger compartment.

9. The method of claim 6, wherein the housing comprises a uniform cross-section such that the illumination exit plane is at essentially the same distance from the circuit board as is a distal end of the lens assembly.

10. The method of claim 6, wherein the first and second light pipes have total internal reflection.

11. The method of claim 6, wherein the first and second light pipes have optical transmissivity characteristics limiting light wavelengths that are conveyed from the first and second infrared light sources, respectively, to the illumination exit plane of the camera assembly.

12. The method of claim 6, wherein an end of the first and second light pipes, respectively, each have a rounded, textured exit geometry providing a shaped, diffused, light cone.

13. The method of claim 12, wherein a diameter of the end of the first and second light pipes, respectively, is between 5 and 6 mm.

14. A camera assembly comprising:
    a circuit board on which an imager is mounted;
    a lens assembly mounted over the imager to the circuit board;

a first light source mounted on the circuit board at a first location that corresponds to a driver area of a passenger compartment;

a second light source mounted on the circuit board at a second location that corresponds to a passenger area of the passenger compartment;

a first light pipe mounted to the circuit board at the first location;

a second light pipe mounted to the circuit board at the second location; and a housing comprising a front side and a rear side, wherein the circuit board, the lens assembly, the first and second light sources, and the first and second light pipes are disposed in the housing, wherein the first and second light pipes respectively extend from the circuit board to the front side of the housing such that light is respectively conveyed from the first and second light sources to an illumination exit plane of the camera assembly at the front side of the housing, which housing thereby does not obstruct respective illumination cones produced at the illumination exit plane, wherein an end of the first and second light pipes, respectively, each have a textured exit geometry providing a diffused, light cone, and wherein a diameter of the end of the first and second light pipes, respectively, is between 5 and 6 mm.

* * * * *